US006533489B1

(12) United States Patent
Zheng

(10) Patent No.: US 6,533,489 B1
(45) Date of Patent: Mar. 18, 2003

(54) 180-DEGREE FOLDING SUPPORT JOINT

(76) Inventor: Edward Zheng, 1736 Wright Ave., La Verne, CA (US) 91750

( * ) Notice: Subject to any disclaimer, the term of this patent is extended or adjusted under 35 U.S.C. 154(b) by 95 days.

(21) Appl. No.: 09/662,954

(22) Filed: Sep. 15, 2000

(51) Int. Cl.[7] ................................................ F16C 11/00
(52) U.S. Cl. ........................ 403/95; 403/95; 403/101; 403/102
(58) Field of Search ........................ 403/119, 100–103, 403/83, 84, 65, 93, 95; 248/291.1, 289.11; 16/228, 234, 387, 390

(56) References Cited

U.S. PATENT DOCUMENTS

| 3,801,208 A | * | 4/1974 | Bourgraf et al. ............... 403/95 |
| 4,684,091 A | * | 8/1987 | Moreschi ...................... 248/166 |
| 5,251,359 A | * | 10/1993 | Finkl ............................. 16/349 |
| 5,367,346 A | * | 11/1994 | Branning ...................... 351/153 |

FOREIGN PATENT DOCUMENTS

WO    WO 94/20877    * 9/1994 ................. 16/228

* cited by examiner

Primary Examiner—Lynne H. Browne
Assistant Examiner—Michael P Ferguson
(74) Attorney, Agent, or Firm—Raymond Y. Chan; David and Raymond Patent Group

(57) ABSTRACT

A 180-degree folding support joint includes a pair of joint members each including an outer wall and an inner wall and defining an engaging slot therebetween for disposing the inner wall of the other joint member therein, wherein a frame leg is adapted to affix on each joint member in such a manner that in a folded condition, each frame leg is adapted for pivotally rotating 180 degrees from each other in order to pivotally fold the frame legs together, and in an unfolded condition, each joint member is biased against each other in order to lock up the rotation of the joint members, so as to align the frame legs with each other.

4 Claims, 5 Drawing Sheets

180-DEGREE FOLDING SUPPORT JOINT

BACKGROUND OF THE PRESENT INVENTION

1. Field of Invention

The present invention relates to folding joint, and more particularly to a 180-degree folding support joint which allows two frame legs to pivotally rotate in 180 degrees in one direction.

2. Description of Related Arts

Folding joints are commonly used in foldable furniture such as chair or table such that the furniture is adapted to be folded into a compact unit for storage and carriage or unfolded for use. Generally, there are two types of folding joint for pivotally connecting the frame legs of the foldable furniture. One of them comprises at least a pivot slot for pivotally connecting the frame leg therein wherein when the foldable furniture is in an unfolded state, the folding joint is capable of partially supporting a downward force applied by a user's weight on the frame leg. However, such type of folding joint has its drawback which will limit the rotating angle of the frame leg in such a manner the frame leg cannot fully extend, so as to limit the shape and size of the foldable furniture especially in an unfolded state. Thus, the folding joint has a bigger size in order to merely distribute the downward force applied by the user's weight.

Another type of folding joint that allows the frame leg to freely rotate about the folding joint such that the foldable furniture can further extend its size and shape in the unfolded state by increasing the rotating angle of the leg frame. However, such folding joint also has its drawback. Since the frame leg is freely rotate about the folding joint, the folding joint merely cannot distribute the user weight but concentrate a stress around the folding joint. So, the frame leg of the foldable chair may need to increase its strength in order to support the user's weight.

SUMMARY OF THE PRESENT INVENTION

A main object of the present invention is to provide a 180-degree folding support joint which allows frame legs to totally rotate 180-degree about the folding support joint in one direction.

Another object of the present invention is to provide a 180-degree folding support joint which can rigidly support the frame legs when they are fully extended, so as to distribute a force applied on the frame legs.

Another object of the present invention is to provide a 180-degree folding support joint which ensures the directional rotation of the frame leg.

Accordingly, in order to accomplish the above objects, the present invention provides a 180-degree folding support joint, comprising a pair of joint members pivotally connected to each other, wherein each joint member having a U-shaped cross-sectional structure comprises an outer wall and an inner wall integrally extended therefrom to define an engaging slot therebetween for being engaged with the inner wall of the other joint member of the respective pair of joint members, and a shaft transversally extended from a bottom portion of the folding support joint in such a manner the joint member is adapted for pivotally rotating 180-degree from each other and being locked up when the joint members are biased against each other.

DETAILED DESCRIPTION OF THE PREFERRED EMBODIMENT

Figure 1:
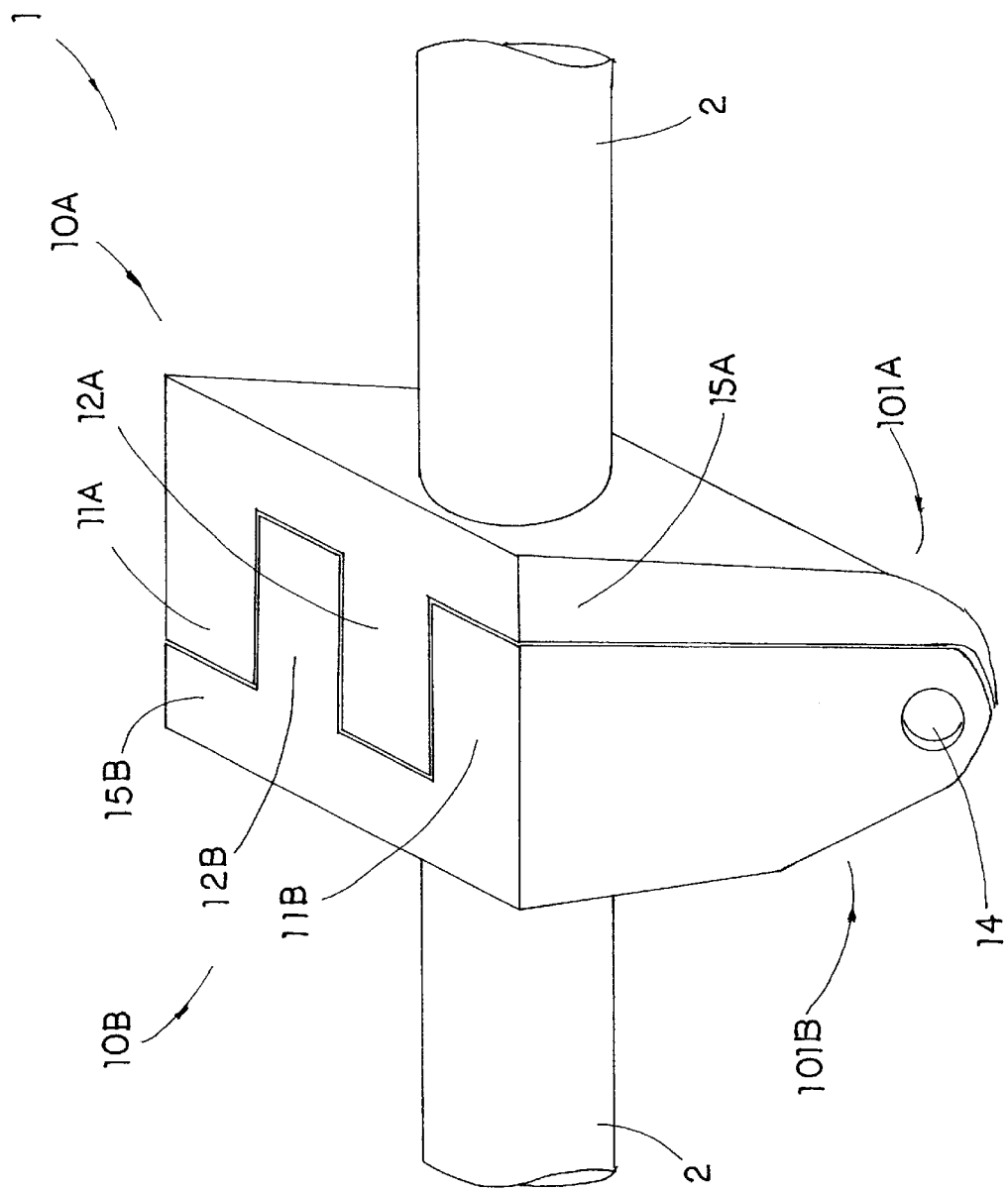
FIG. 1 is a prospective view of a 180-degree folding support joint according to a preferred embodiment of the present invention.
Figure 3:
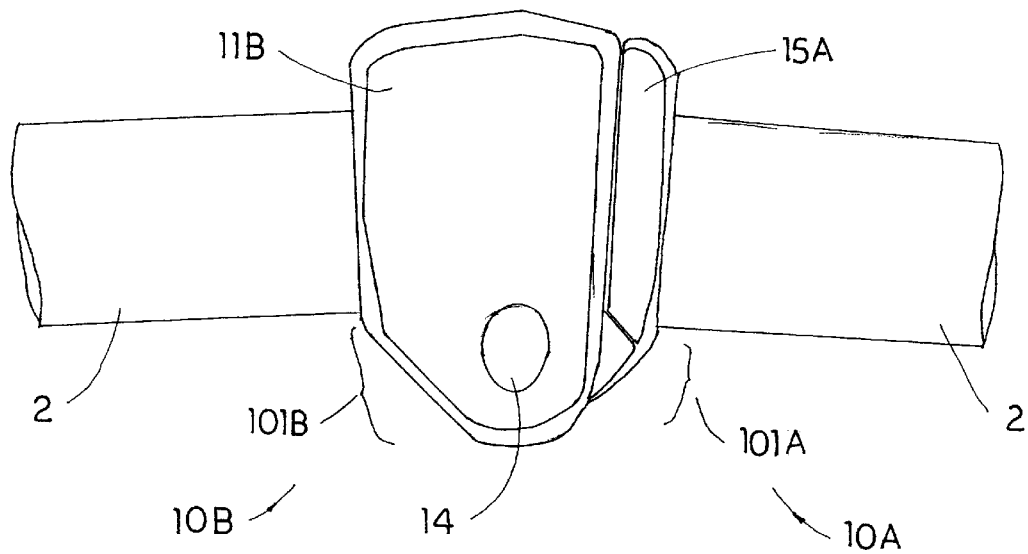
FIG. 3 is a side view of the 180-degree folding support joint according to the above preferred embodiment of the present invention.
Figure 4:
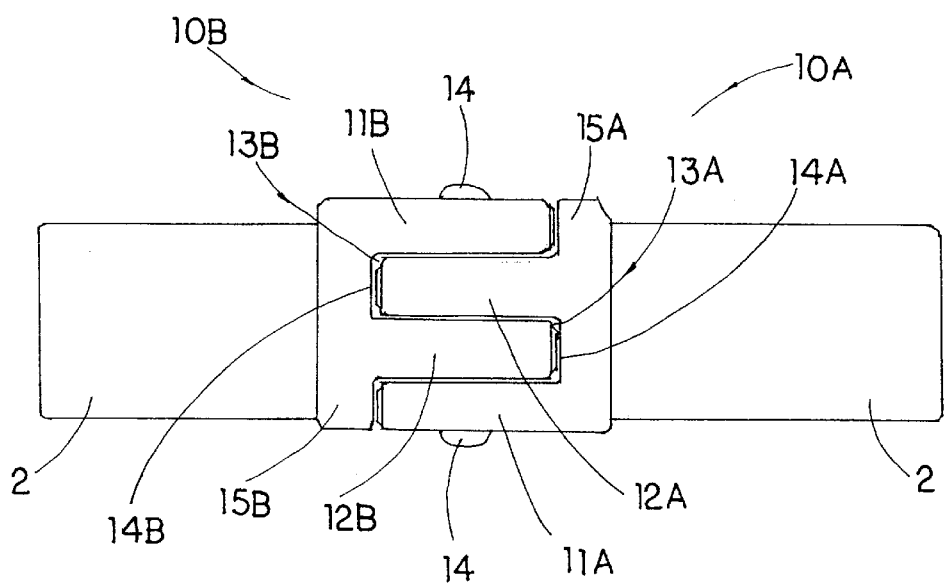
FIG. 4 is a top view of the 180-degree folding support joint according to the above preferred embodiment of the present invention.

Referring to FIGS. 1, 3, and 4 of the drawings, a 180-degree folding support joint 1 according to a preferred embodiment of the present invention, which comprises a pair of joint members 10A, 10B pivotally connected each other wherein a frame leg 2 is saffixed on each joint member 10A, 10B in such a manner each frame leg 2 connected to the joint member 10A, 10B is adapted for pivotally rotating 180 degrees from each other and being locked up when the joint member 10A, 10B is biased against each other.

Figure 2:
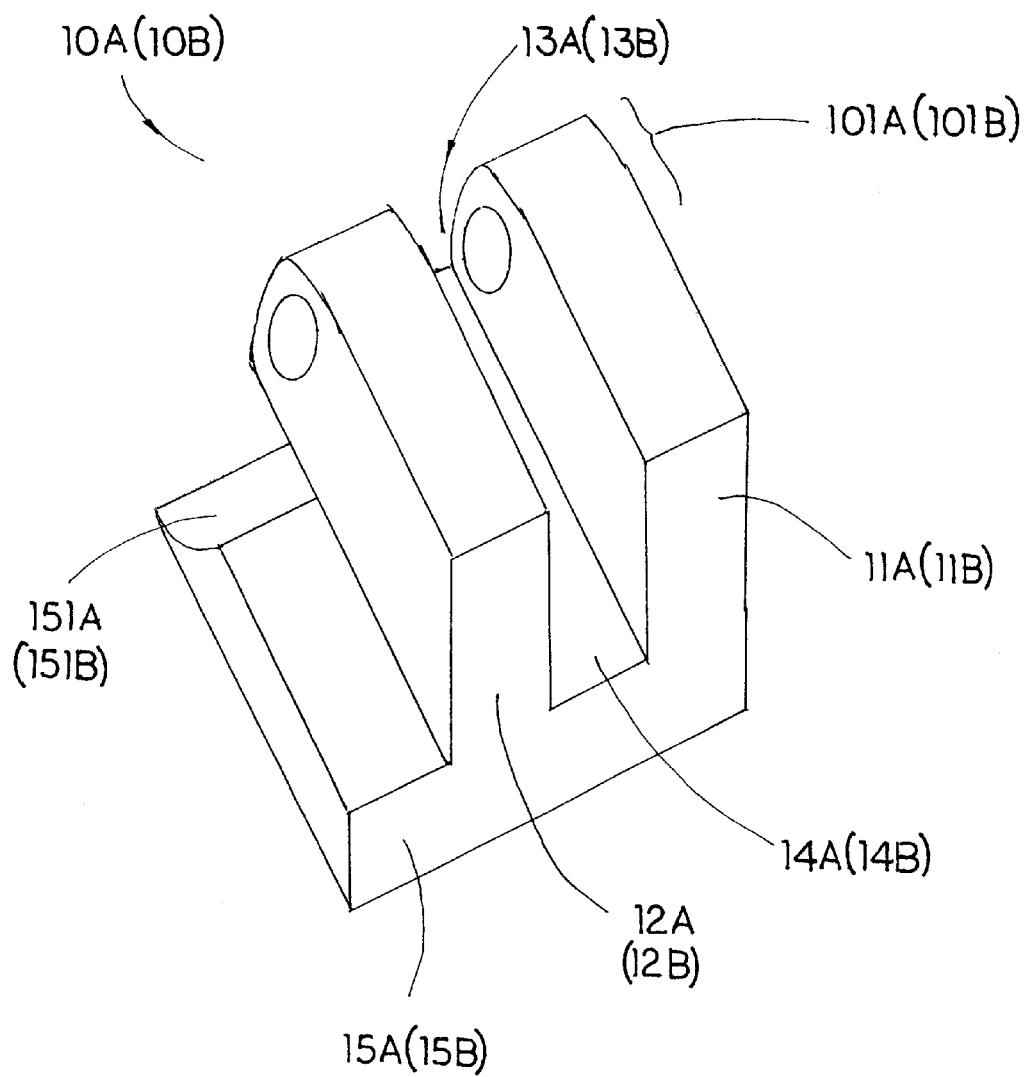
FIG. 2 is a perspective view of a joint member of the 180-degree folding support joint according to the above preferred embodiment of the present invention.

As shown in FIG. 2, each joint member 10A, 10B having a U-shaped cross-sectional structure comprises an outer wall 11A, 11B and an inner wall 12A, 12B integrally extended therefrom to define an engaging slot 13A, 13B therebetween wherein a blocking surface 14A, 14B is provided on a bottom surface of each engaging slot 13A, 13B. Each inner wall 12A, 12B has a thickness slightly smaller than a width of the engaging slot 13A, 13B in such a manner the inner wall 12A, 12B is adapted for fittingly engaging in the engaging slot 13B, 13A of the respective pair of joint members 10A, 10B.

In addition, each joint member 10A, 10B has a curved bottom portion 101A, 101B wherein a shaft 14 transversally extended from the bottom portion 101A, 101B of each joint member 10A, 10B such that the joint member 10A, 10B is pivotally rotated about the shaft 14 within 180 degrees, and a blocking wall 15A, 15B having a respective arc surface 151A, 151B integrally and horizontally extended on a side of each joint member 10A for biasing against the outer wall 11B of the other joint member 10B of the respective pair of the joint members 10A, 10B, so as to limit the rotation of the joint member 10A, 10B.

In a folded state of the folding support joint 1, as shown in FIG. 1, each inner wall 12A of the joint member 10A is pivotally engaged with engaging slot 13B of the other joint member 10B of the same pair of joint members 10A, 10B wherein the inner wall 12A is biased against the respective blocking surface 14B of the engaging slot 13B so as to block up the rotation of the joint member 10A. Thus, the blocking wall 15A of the joint member 10A is also biased against the respective outer wall 11A of the joint member 10B for blocking up the rotation of the joint member 10B. So, the two frame legs 2 affixed to the joint members 10A, 10B respectively are aligned each other, as shown in FIG. 3.

Figure 5:
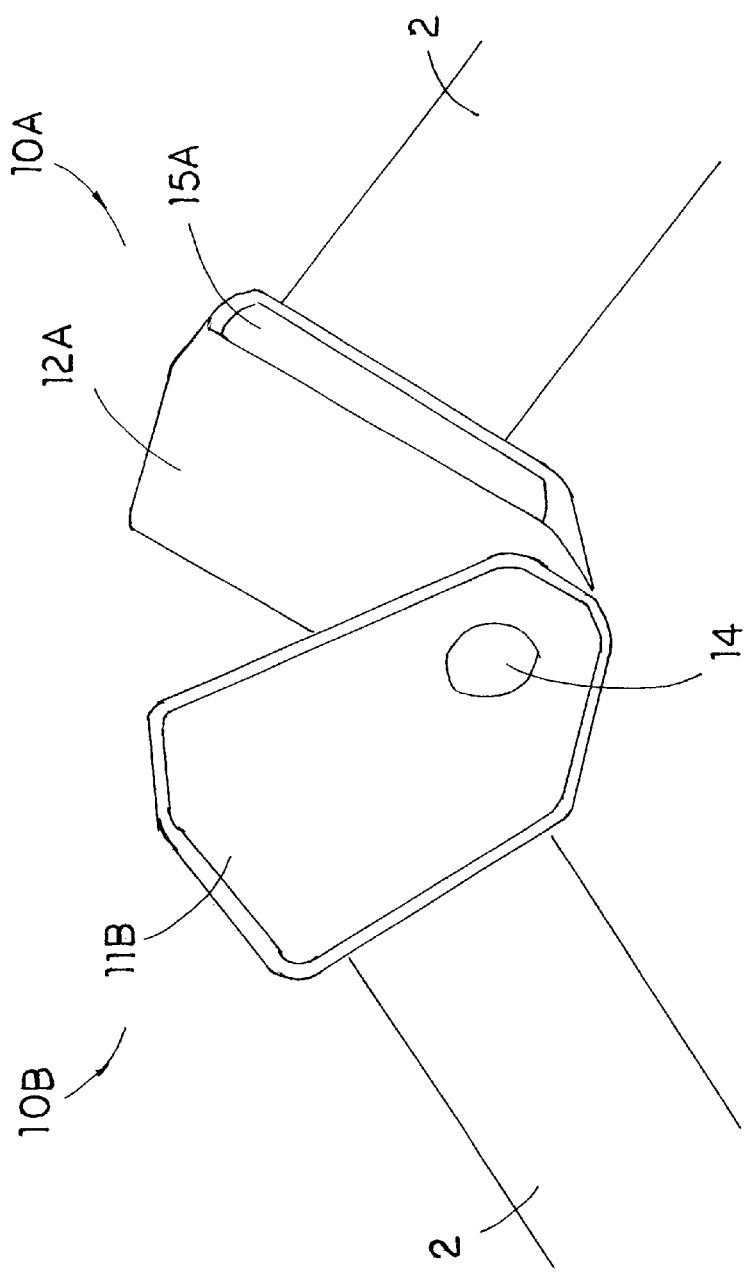
FIG. 5 is a perspective of the 180-degree folding support joint in a folding state according to the above preferred embodiment of the present invention.

When unfolding the folding support joint 1, as shown in FIG. 5, each joint member 10A, 10B is pivotally rotated about the shaft 14 in opposite direction in such a manner the frame legs 2 are adapted for rotating totally 180 degrees such that the frame legs 2 are folded up as they are parallel to each other. It is worth to mention that the arc surface 151A of the blocking wall 15A is perfectly slid along the bottom portion 101B of the other outer wall 11B of the same pair of joint members 10A, 10B, so as to guide the joint members 10A, 10B in a corrected rotatably movable manner.

Figure 6:
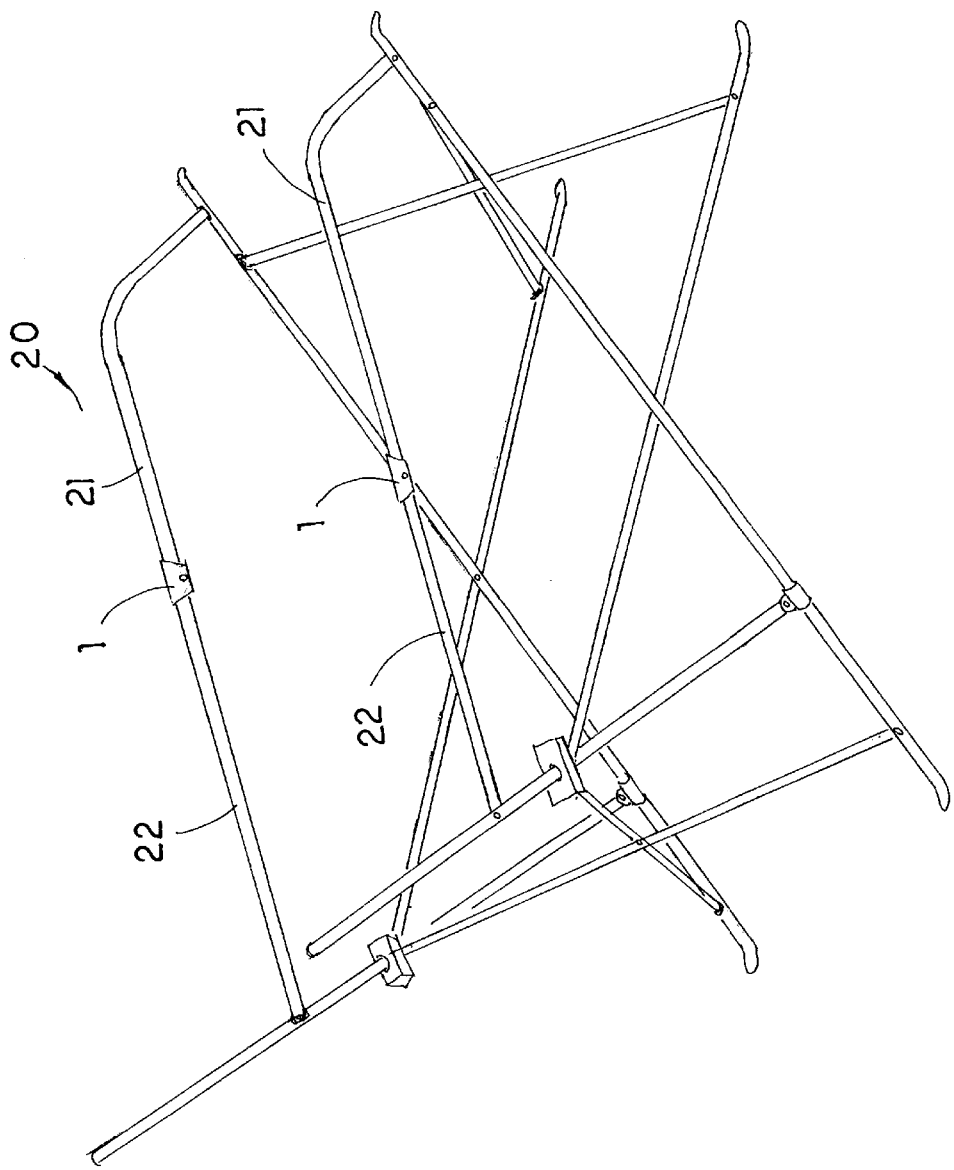
FIG. 6 illustrates an armrest of a folding chair employed with the 180-degree folding support joint according to the above preferred embodiment of the present invention.

Referring to FIG. 6, an application of the 180-degree folding support joint 1 according to the preferred embodiment of the present invention is illustrated, wherein the folding support joint 1 is adapted to be used in a conventional folding chair. The folding chair comprises a pair of armrest frames 20 for supporting a user's arms thereon. Each armrest frame 20 comprises a front frame arm 21 and a rear frame arm 22 pivotally connected together such that when the folding chair is in an unfolded state, the front frame arm 21 is arranged to align with the rear frame arm 22 so as to support the user's arm in a flat manner. Moreover, when the folding chair is folded up, the front frame arm 21 and the rear frame arm 22 are pivotally rotated in opposite direction, so as to fold up the armrest frame 20.

So, the front frame arm 21 is adapted to affix on the joint member 10A and the rear frame arm 22 is adapted to affix on the other joint member 10B such that in the unfolded state of the folding chair, the two joint member 10A, 10B are biased against each other so as to align the front frame arm 21 with the rear frame arm 22. The joint members 10A, 10B have increased the engaging surface therebetween, so as to evenly distribute a downward force applied by the user's weight.

Furthermore, when the user's arm is supported on the armrest frame 20, the user's weight applied on the armrest frame 20 will substantially press the front and rear frame arms 21, 22 together and thus ensure the engagement between the two joint members 10A, 10B. In other words, the weight of the user will reinforce the inner wall 12A of the joint member 10A to engage with the engaging slot 13B of the respective joint member 10B.

What is claimed is:

1. A 180-degree folding support joint, which comprises a pair of joint members foldably and pivotally connected to each other and a pair of frame legs affixed on said two joint members respectively in such a manner that in a folded condition, one of said frame legs is pivotally rotated 180 degrees towards the other frame leg in order to pivotally fold said frame legs together in a parallel manner, and in an unfolded condition, each of said joint members is biased against each other to lock up the rotation of said joint members so as to align said frame legs with each other;

wherein each of said joint members has a U-shaped cross-sectional structure and comprises:

an outer wall and an inner wall integrally extended therefrom to define an engaging slot therebetween and a blocking surface provided on a bottom surface of said engaging slot;

a bottom portion wherein a shaft is transversally extended through said bottom portion of each of said joint member in such a manner that each of said joint members is capable of pivotally rotating about the shaft within 180 degrees; and a blocking wall integrally and horizontally extended on a side of said respective joint member for biasing against said outer wall of other said joint member so as to limit the rotation of each of said joint members in said unfolded condition;

wherein in said unfolded condition, said inner wall of each of said joint members is pivotally engaged with said engaging slot of other said joint member, and biased against said respective blocking surface of said engaging slot so as to lock up the rotation of other said joint member so that said two frame legs are aligned with each other;

wherein in said folded condition, each of said joint members is pivotally rotated about said shaft in an opposite direction in such a manner that said frame legs are adapted for rotating totally 180 degrees so that said frame legs are folded up to be parallel with each other.

2. A 180-degree folding support joint, as recited in claim 1, wherein said blocking wall of each joint member has an arc surface for fittingly sliding along a curved bottom portion of said outer wall of said other joint member, so as to guide said joint members in a corrected rotatably movable manner.

3. A 180-degree folding support joint, as recited in claim 1, wherein said inner wall of each joint member has a thickness slightly smaller than a width of said engaging slot of said joint member in such a manner said inner wall is adapted to pivotally engage with said engaging slot from other said joint member.

4. A 180-degree folding support joint, as recited in claim 2, wherein said inner wall of each joint member has a thickness slightly smaller than a width of said engaging slot of said joint member in such a manner said inner wall is adapted to pivotally engage with said engaging slot from other said joint member.

* * * * *